UNITED STATES PATENT OFFICE 2,324,494

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application July 7, 1941, Serial No. 401,384

10 Claims. (Cl. 252—341)

This invention relates primarily to the resolution of petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipe line oil.

The new chemical compond or composition of matter herein described, that is used as the demulsifying agent of our process, is exemplified by the acidic, or preferably, neutral ester derived by complete esterification of one mole of a polyalkylene glycol of the kind hereinafter described, with two moles of a fractional ester derived from a hydroxylated material of the kind herein described, and a polybasic carboxy acid having not over six carbon atoms.

If a hydroxylated material, indicated for the sake of convenience by the formula T.OH, is reacted with a polybasic carboxy acid, which, similarly, may conveniently be of the dibasic type and indicated by the formula $$HOOC.D.COOH$$

then the fractional ester obtained by reaction between equimolar quantities may be indicated by the following formula:

$$HOOC.D.COO.T$$

The polyethylene glycol may be characterized by materials of the kind such as heptaethylene glycol, octaethylene glycol, nonaethylene glycol, decaethylene glycol, to and including heptadecaethylene glycol. For convenience these polyethylene glycols may be indicated by the following formula:

$$OH(C_2H_4O)_mH$$

in which $m$ varies from 7 through 17.

Instead of polyethylene glycols, one may use polypropylene glycols or polybutylene glycols. Thus, for convenince, in the broadest aspect, the polyalkylene glycols employed may be cated by the following formula:

$$OH(C_nH_{2n}O)_mH$$

in which $m$ has its previous significance, represents a numeral varying from 2 to 4.

Thus, the bulk of the materials herein templated, as demulsifiers, may be ind within certain variations, as hereinafter s by the neutral ester derived by esterificat one mole of a glycol of the kind above desc with two moles of a fractional ester of the previously described. The formation of the pound may be indicated by the following tion, although obviously, it is immaterial particular procedure is employed to produ particular chemical compound or product $$T.OOC.D.COOH+OH(C_2H_4O)_mH+$$
$$HOOC.D.CC$$
$$T.OOC.D.COO(C_2H_4O)_{m-1}C_2H_4.OOC.D.CC$$

As indicated previously, the polybasic employed are limited to the type havin more than six carbon atoms, for example, malonic, succinic, glutaric, and adipic. larly, one may employ acids such as fu maleic, glutaconic, and various others, inc citric, malic, tartaric, and the like. The sel of the particular tribasic or dibasic aci ployed is usually concerned, largely, with venience of manufacture of the finished and also of the price of the reacants. Ger speaking, the higher the temperature emp the easier it is to obtain large yields of t terified product. Although oxalic acid is paratively cheap, it decomposes somewhat ily at slightly above the boiling point of For this reason, it is more desirable to 1 acid which is more resistant to pyrolysis. larly, when a polybasic acid is available form of an anhydride, such anhydride to produce the ester with greater ease th acid itself. For this reason, maleic anh is particularly adaptable; and also, ever else considered, the cost is comparative on a per molar basis, even though son higher on a per pound basis. Succini or the anhydride has many of the att qualities of maleic anhydride; and this true of adipic acid. For purposes of t the bulk of the compounds hereinafter trated will refer to the use of maleic anh although it is understood that any othe able polybasic acid may be employed. Fu more, for purposes of convenience, refer the use of polyethylene glycols. As has ...viously indicated, such glycols can be re-...y suitable polypropylene or polybutylene ...ids.

...as the range of oxyalkylated compounds ...d as reactants is concerned, it is our ...ce to employ those having approximately ...alkylene groups, particularly 8–12 oxy-...groups. Our preference to use the oxy-...l compounds is due, largely, to the fact ...y are commercially available, and par-...so in two desirable forms. The most de-...orm is the so-called nonethylene glycol, ...lthough consisting largely of nonaethyl-...ol, may contain small amounts of hep-...ne and octaethylene glycols, and pos-...nor percentages of the higher homologs. ...ycols represent the upper range of dis-...glycols; and they may be conveniently ...to as "upper distillable ethylene glycols." ...no particularly good procedure for mak-...arper separation on a commercial scale; ...understood that mixtures of one or more ...ycols may be employed, as well as a single ...As pointed out, it is particularly pre-...employ nonaethylene glycol as commer-...ailable, although it is understood that ...luct contains other homologs, as indi- ...ntially as desirable as the upper dis-...olyethylene glycols, are the lower non-...e polyethylene glycols. These materials ...able in the form of a waxy water-soluble ..., and the general range may vary some-...m deca- to tetradecaethylene glycol. As ...nderstood, the method of producing such ...ould cause some higher homologs to be ...and thus, even in this instance, there ...present some oxyethylene glycols within ...er range above indicated. One need not ...t that these particular compounds con-...ixtures, and that in some instances, par-...desirable esters are obtained by making ...of the liquid nonaethylene glycol with ...waxy, lower non-distillable polyethylene ...For the sake of convenience, reference ...camples will be to nonaethylene glycol; ...ulations will be based on a theoretical ...r weight of 414. Actually, in manufac-...! molecular weight of the glycol em-...hether a higher distillable polyethylene ...a lower non-distillable polyethylene gly-...mixture of the same, should be deter-...nd reaction conducted on the basis of ...ermination, particularly in conjunction ...hydroxyl or acetyl value.

...been previously pointed out that it is ...al how the compounds herein contem-...re manufactured, although we have ...most desirable to react the selected gly-...xtures of glycols with maleic anhydride ...of two moles of the anhydride for one ...he glycol. Under such circumstances, ...found little tendency to form longer ...ymers; and in fact, the product of reac-...onducted at reasonably low tempera-...ears to be largely monomeric. For con-...such intermediate fractional ester may ...onsidered as a dibasic or polybasic acid. ...of the intermediate fractional esters, ...d, is then reacted with two moles of the ...material of the kind subsequently debe noted, however, that if one prepares
al acidic ester, and if two moles of the fractional acidic ester are reacted with one mole of the polyethylene glycol, there is no possibility for the formation of polymeric types of esterification products under ordinary conditions.

The alcoholic bodies employed are hydroxylated acylated diamides containing: (a) an acyl radical derived from a polybasic carboxy acid having not more than 6 carbon atoms, and the acyl radical thereof linked to two amino nitrogen atoms; (b) an acyl radical derived from a detergent-forming monocarboxy acid having at least 8 and not more than 32 carbon atoms; and (c) an alcoholiform hydroxyl radical.

Detergent-forming acids having at least 8 and not more than 32 carbon atoms are exemplified by fatty acids, naphthenic acids, abietic acids, oxidized paraffin or wax acids, or the like, or by simple modifications thereof, which do not detract from the ability of the acid to combine with alkali to produce soap or soap-like materials. As to oxidized petroleum acids, see U. S. Patent No. 2,242,837, dated May 20, 1941, to Shields.

Thus, hydrogenated oleic acid, chlorinated naphthenic acid, or brominated abietic acid will form such detergent-forming bodies with the same ease as the parent materials themselves. The oxidized acids obtained by blowing or oxidation of the acids or esters, are satisfactory. Such acids have frequently been referred to collectively in the art as monocarboxy detergent-forming acids. Needless to say, the acylation need not be conducted by means of the acid itself, but may be conducted by means of any compound of the acid which contains the acid radical; for instance, an ester, an amide, an anhydride, an acyl chloride, etc.

It is our preference to use the fatty acids as the most desirable form of a detergent-forming acid, and particularly the unsaturated fatty acids, for instance, ricinoleic acid, oleic acid, mixed fatty acids derived from soyabean oil, rapeseed oil, sesame oil, cottonseed oil, corn oil, peanut oil, and the like. Fatty acids such as lauric acid, myristic acid, palmitic acid, and the like, may be employed.

The polybasic carboxy acids which may be employed include oxalic acid, malonic acid, succinic acid, glutaric acid, adipic acid, tricarballylic acid, fumaric acid, maleic acid, aconitic acid, malic acid, tartaric acid, citric acid, etc. Such acids may be conveniently referred to as low molal polybasic carboxy acids, or, more preferably, low molal acids.

In regard to both the detergent-forming acids and in regard to the low molal acids, it is obvious that one need not use the acid itself as a reactant, but may use some suitable derivative, such as the acyl chloride, the anhydride, the ester, or amide; i. e., any suitable form may be used which is the functional equivalent in supplying the acyl radical.

Suitable primary and secondary amines which may be used as primary reactants include the following hydroxylated types: diethanolamine, monoethanolamine, ethyl ethanolamine, methyl ethanolamine, propanolamine, dipropanolamine, propyl propanolamine, etc. Other examples include cyclohexylolamine, dicyclohexylolamine, cyclohexyl ethanolamine, cyclohexyl propanolamine, benzylethanolamine, benzylpropanolamine, pentanolamine, hexanolamine, ocetylethanolamine, octadecylethanolamine, cyclohexanolethanolamine, etc.

If the low molal polycarboxy acid happens to be hydroxylated, as in the instance of tartaric acid, citric acid, hydroxysuccinic acid, and the like, it is obvious that a hydroxylated detergent-forming acid, for instance, ricinoleic acid, hydroxystearic acid, and the like, could be esterified therewith, i. e., with the hydroxyl group which is part of the low molal acyl radical; and under such circumstances, the primary or secondary amine need not be hydroxylated. Under these circumstances, one might employ compounds, such as amylamine, diamylamine, butylamine, dibutylamine, benzylamine, cyclohexylamine, etc.

Other suitable types of amines will be described subsequently. For instance, one may employ the type involving the presence of an ether linkage, as, for example, the following:

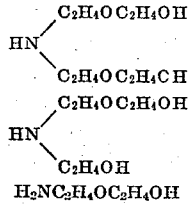

$H_2NC_2H_4OC_2H_4OH$

Subsequently, reference will be made to U. S. Patent No. 2,238,929, dated April 22, 1941, to Cahn and Harris. Momentarily attention is directed to the numerous amino compounds, particularly secondary hydroxylated amines there described. Such additional amino compounds are suitable as reactants, in view of what will be said subsequently.

In the aforementioned Cahn and Harris patent there is described certain materials which are employed in the manufacture of new compounds of the kind specifically contemplated in said Cahn and Harris patent. Said compounds are derived both from low molal monocarboxy acids and low molal polybasic carboxy acids. It may be well to illustrate both types, in order to understand clearly the manufacture of the intermediate products for use in obtaining the compositions of matter herein contemplated, and particularly when manufactured for use as demulsifiers of water-in-oil emulsions.

Example A, part 1 of the aforementioned Cahn and Harris patent will serve excellently as an initial illustration and is as follows:

"*Example A*

(1) 224 grams of methyl acetate (3 moles) and 210 grams of diethanolamine (2 moles) were mixed together, two layers forming at first, the mixture becoming a homogeneous mass after a short time. The mixture was refluxed for 19 hours at which time 90% of the diethanolamine had reacted. A portion of the reaction mixture was subjected to a vacuum of 6 millimeters at 60 degrees C. in order to drive off the volatile material, namely, the unreacted methyl acetate and the methyl alcohol which was formed during the reaction. The residue, upon titration, showed a content of 4.64% of free diethanolamine. To 192.5 grams of this residue, 34.7 grams of methyl acetate were added and the mixture was refluxed for 3½ hours. The resulting reaction product was then freed from its low boiling constituents, namely, the methyl alcohol and unreacted methyl acetate, by maintaining the mass at 70 degrees C. under a pressure of 6 millimeters. The residue contained approximately 0.8% of unreacted diethanolamine, based upon a determination of the alkalinity of said residue by titration. The product was a light yellow colored syrup, soluble in water, and contained a compound which was essentially the acetic acid amide of diethanolamine, having the following formula:

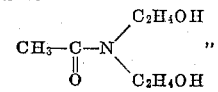

Having obtained a material of the kind above described, it is obvious that one can then esterify the material with either one or two moles of a detergent-forming monocarboxy acid, so as to obtain a hydroxylated derivative. Obviously, if the detergent-forming acid employed does not contain an alcoholic hydroxyl radical, for instance, if it is of the type other than that exemplified by ricinoleic acid, hydroxystearic acid, and the like, then one can only esterify one mole of such detergent-forming acid with a compound of the kind above described, for the reason that there must be a residual alcoholiform hydroxyl radical. If, however, an acid such as ricinoleic acid, hydroxystearic acid, or the like is employed, then, of course, two moles of such detergent-forming acid can be employed. Similarly, if desired, one might esterify one hydroxyl with oleic acid, and the other hydroxyl with ricinoleic acid.

If the experiment above described is repeated, using monoethanolamine in the equivalent amount, then the final product is characterized by the following formula:

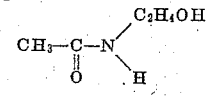

The limitations in regard to the above type of compound is perfectly obvious. Unless one can produce a secondary amide, which is difficult, and generally speaking, not particularly feasible, one must, of necessity, esterify with a hydroxylated detergent-forming acid, such as ricinoleic acid, hydroxystearic acid, or the like.

If, however, instead of using acetic acid, one uses lactic acid or some other hydroxylated low molal carboxy acid, then the two formulas above described change to the following forms:

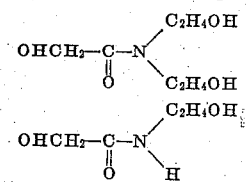

The presence of this additional hydroxyl offers additional opportunity for reaction, and further elaboration is not necessary, except perhaps, to point out that even a type of material such as the following:

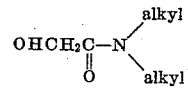

might be employed, provided that ricinoleic acid, for example, is esterified with the hydroxyl of the low molal monocarboxy acid acyl group. Other variants too numerous to mention suggest themselves, as, for example, derivatives of tris (hydroxymethyl)aminomethane, or similar types of compounds, such as an amide of the following type, which may be used for reaction with a detergent-forming acid:

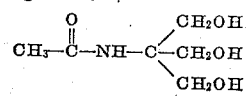

Again attention is directed to the aforementioned Cahn and Harris patent, insofar that it illustrates a large number of intermediate products which may be utilized to produce various final compositions of matter, as, for example, sulfated or sulfonated derivatives, as contemplated in said aforementioned U. S. Patent No. 2,238,929. However, the intermediate materials there described obviously can be used as alcoholic bodies in the preparation of compounds of the type herein contemplated. Such materials as there described are largely derivatives of hydroxylated secondary amines; but for the purposes herein contemplated, such limitation does not exist in view of what has already been said.

In the present instance, however, one is concerned with derivatives obtained from low molol polybasic carboxy acids of the kind described; and it is to be noted that, although many illustrations in the aforementioned Cahn and Harris patent are concerned with low molal monocarboxy acids, the corresponding low molal polybasic carboxy acid compound is readily obtainable, all of which will be obvious, in view of what is said subsequently.

The following is substantially the manufacturing procedure set forth in the Cahn and Harris patent, and which has been quoted in detail under the item previously identified as Example A, part 1:

One can employ one pound mole of diethyl oxalate and two pound moles of monoethanolamine and react these compounds in a similar manner. This procedure yields a corresponding diamide of oxalic acid, along with the liberation of two pound moles of ethyl alcohol. Such bis(hydroxyethyl) oxalic acid diamide may be reacted with ricinoleic acid in the ratio of one pound mole of the diamide for 2 pound moles of ricinoleic acid. Similarly, a product can be obtained employing only one mole of ricinoleic acid for one mole of the diamide; or one might employ one mole of oleic acid and one mole of ricinoleic acid for each mole of the diamide. Similarly, diethanolamine may be employed with diethyl oxalate to give the corresponding tetra(hydroxyethyl) oxalic acid diamide. Instead of diethyl oxalate, diethyl maleate or numerous other reactants can be employed. Attention is called to the fact that hydroxylated polybasic carboxy acids might be employed in the same manner as hydroxy acetic acid can be employed in the analogous type of compound where a low molal monocarboxy acid is used.

By way of illustration, the following examples will serve:

HYDROXYLATED DIAMIDE TYPE INTERMEDIATE

Example 1

One pound mole of a diamide of the following type formula:

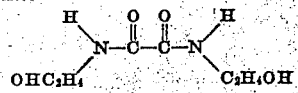

is esterified with one pound mole of ricinoleic acid until esterification is complete. Such esterification reaction can be conducted by any one of the conventional means, usually heating at a temperature above the boiling point of water; for instance, 116–160° C. is sufficient. In some cases it may be desirable to pass a dried inert gas through the reacting mass, as, for example, dried carbon dioxide or dried nitrogen. Sometimes the reaction is extended by the presence of a small amount of a sulfonic acid as a catalyst, for instance, ½% of toluene sulfonic acid. In other instances, esterification may be conducted in the presence of an inert solvent, such as xylene, which is permitted to distil off, carrying water vapor with it. The vapors are condensed, separation of water and xylene permitted to take place, and the xylene returned to the reacting vessel while the water is diverted to a suitable draw-off connection.

HYDROXYLATED DIAMIDE TYPE INTERMEDIATE

Example 2

One pound mole of oleic acid is substituted for one pound mole of ricinoleic acid in the preceding example.

HYDROXYLATED DIAMIDE TYPE INTERMEDIATE

Example 3

One pound mole of naphthalenic acid is substituted for ricinoleic acid in Example 1, preceding.

HYDROXYLATED DIAMIDE TYPE INTERMEDIATE

Example 4

Two pound moles of ricinoleic acid are substituted for one pound mole of ricinoleic acid in Example 1, preceding.

HYDROXYLATED DIAMIDE TYPE INTERMEDIATE

Example 5

One pound mole of oleic acid and one pound mole of ricinoleic acid are substituted for one pound mole of ricinoleic acid in Example 1, preceding.

HYDROXYLATED DIAMIDE TYPE INTERMEDIATE

Example 6

The diamide derived from diethanolamine and diethyl oxalate of the following composition:

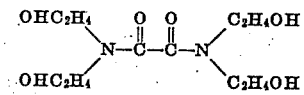

is substituted for the amide in Examples 1–5, preceding.

HYDROXYLATED DIAMIDE TYPE INTERMEDIATE

Example 7

One pound mole of diethyl oxalate is reacted with one pound mole of monoethanolamine and one pound mole of diethanolamine to give a mixture containing some diamides of the types described in the preceding examples, and also having present an appreciable amount of a diamide of the following composition:

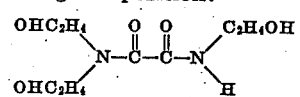

Such reactant is employed in the manner suggested in Examples 1–5, preceding.

HYDROXYLATED DIAMIDE TYPE INTERMEDIATE

Example 8

Monopropanolamine and dipropanolamine are employed to give compounds comparable to those described in Examples 1–7, preceding.

HYDROXYLATED DIAMIDE TYPE INTERMEDIATE

Example 9

One pound mole of diethyl oxalate is reacted with tris(hydroxymethyl) aminomethane to give a diamide of the following composition:

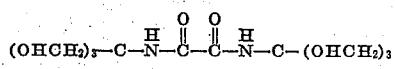

Such diamide is substituted in the previous examples, such as 1-5, inclusive.

Hydroxylated Diamide Type Intermediate

Example 10

Diethyl maleate is substituted for diethyl oxalate in Examples 1-9, preceding.

Having obtained hydroxylated acylated amido compounds of the kind previously described, the next step, of course, is to obtain fractional esters derived from nonaethylene glycol of the kind described in the earlier part of the present disclosure. Such materials may be illustrated by the following:

Glycol Ester Intermediate Product

Example 1

One pound mole of nonaethylene glycol is treated with two pound moles of maleic anhydride, so as to form nonaethylene glycol dihydrogen dimaleate.

Glycol Ester Intermediate Product

Example 2

A mixture of lower non-distillable polyethylene glycols, representing approximately deca- to tetradecaethylene glycol, is substituted for nonaethylene glycol in the preceding example.

Glycol Ester Intermediate Product

Example 3

A 50-50 mixture of nonaethylene glycol and lower non-distillable polyethylene glycols of the kind described in the previous example is substituted for nonaethylene glycol in Example 1.

Glycol Ester Intermediate Product

Example 4

Adipic acid is substituted for maleic anhydride in Examples 1-3, preceding.

Glycol Ester Intermediate Product

Example 5

Oxalic acid is substituted for maleic anhydride in Examples 1-3, preceding.

Glycol Ester Intermediate Product

Example 6

Citric acid is substituted for maleic anhydride in Examples 1-3, preceding.

Glycol Ester Intermediate Product

Example 7

Succinic anhydride is substituted for maleic anhydride in Examples 1-3, preceding.

The method of producing such fractional esters is well known. The general procedure is to employ a temperature above the boiling point of water and below the pyrolytic point of the reactants. The products are mixed and stirred constantly during the heating and esterification step. If desired, an inert gas, such as dried nitrogen, or dried carbon dioxide, may be passed through the mixture. Sometimes it is desirable to add an esterification catalyst, such as sulfuric acid, benzene sulfonic acid, or the like. This is the same general procedure as employed in the manufacture of ethylene glycol dihydrogen diphthalate. See U. S. Patent No. 2,075,107, date March 30, 1937, to Frasier.

Sometimes esterification is conducted mo readily in the presence of an inert solvent, th carries away the water of esterification whic may be formed, although, as is readily apprec ated, such water of esterification is absent whe the reaction involves an acid anhydride, such maleic anhydride, and a glycol. However, if w ter is formed, for instance, when citric acid employed, then a solvent such as xylene may l present and employed to carry off the wat formed. The mixture of xylene vapors and w ter vapors can be condensed so that the water separated. The xylene is then returned to t reaction vessel for further circulation. This a conventional and well known procedure ar requires no further elaboration.

Composition of Matter

Example 1

Two pound moles of a material of the ki exemplified by Hydroxylated diamide type inte mediate, Example 1, preceding, are reacted wi one pound mole of a glycol ester intermedia product of the kind described under Glycol est intermediate products, Examples 1, 2 and 3, pr ceding. Such reaction is continued until all ca boxyl acidity has disappeared. The time of r action may vary from a few hours to as many 20 hours.

Composition of Matter

Example 2

The same procedure is followed as in Compo tion of matter, Example 1, except that one er ploys a hydroxylated diamide type intermedia product described in Hydroxylated diamide ty intermediate, Example 2, preceding, instead in Example 1.

Composition of Matter

Example 3

The same procedure is followed as in Compo tion of matter, Example 1, except that one er ploys a material of the kind described in H droxylated diamide type intermediate, Exam 3, preceding, instead of in Example 1.

Composition of Matter

Example 4

The same procedure is followed as in Compo tion of matter, Example 1, except that one er ploys a material of the kind described in H droxylated diamide type intermediate, Exam 4, preceding, instead of in Example 1.

Composition of Matter

Example 5

The same procedure is followed as in Compo tion of matter, Example 1, except that one e ploys a material of the kind described in H droxylated diamide type intermediate, Exam 5, preceding, instead of in Example 1.

Composition of Matter

Example 6

The same procedure is followed as in Compo tion of matter, Example 1, except that one e ploys a material of the kind described in E droxylated diamide type intermediate, Exam 6, preceding, instead of in Example 1.

Composition of Matter

Example 7

The same procedure is followed as in Composition of matter, Example 1, except that one employs a material of the kind described in Hyroxylated diamide type intermediate, Example preceding, instead of Example 1.

Composition of Matter

Example 8

The same procedure is followed as in Composition of matter, Example 1, except that one employs a material of the kind described in Hyroxylated diamide type intermediate, Example preceding, instead of Example 1.

Composition of Matter

Example 9

The same procedure is followed as in Composition of matter, Example 1, except that one employs a material of the kind described in Hyroxylated diamide type intermediate, Example preceding, instead of Example 1.

Composition of Matter

Example 10

The same procedure is followed as in Composition of matter, Example 1, except that one employs a material of the kind described in Hyroxylated diamide type intermediate, Example preceding, instead of Example 1.

Composition of Matter

Example 11

Glycol ester intermediate products of the kind described by Examples 4–7, preceding, are substituted for Glycol ester intermediate products, 1, 2 and 3, in the preceding ten examples.

In such previous examples, which include the use of ricinoleic acid, attention is directed to the fact that excellent products of unusual value are obtainable by substituting oxyalkylated ricinoleic acid, particularly oxyethylated ricinoleic acid, in place of ricinoleic acid. The preparation of such material is well known, and preferably, involves the following procedure:

Triricinolein in the form of castor oil is treated with 3–12 moles of ethylene oxide for each mole of ricinolein. One-half of 1% of sodium stearate or sodium ricinoleate is used as a catalyst. A temperature of 100–200 C. is employed. The reaction is conducted varying from 100 lbs. to 300 gauge pressure. The water-insoluble oxyalkylated triricinolein, so obtained, is saponified so as to yield a water-insoluble oxyethylated ricinoleic acid, or one, which at the most, is self-emulsifying.

In reviewing what has been said, it is obvious that a wide range in carbon atom content exists in regard to the alcoholic bodies employed for reaction with the glycol dihydrogen diacid ester. This may be illustrated by the following examples:

If oxalic acid or ethyl oxalate is reacted with diethanolamine, the compound previously described contains only 6 carbon atoms. If such product is then reacted with one mole of octanoic acid, the alcoholic body contains a total of 14 carbon atoms. On the other hand, a product obtained from oxalic acid and diethanolamine has 6 carbon atoms; and if one introduces 4 ricinoleyl radicals, one adds 72 more carbon atoms. Indeed, similar derivatives suggest themselves, whereby three ricinoleyl radicals are introduced, thus adding 54 carbon atoms in each half of the alcoholic radical or each amide group of the diamide. With this in mind, it is obvious that rather large molecularly sized alcoholic materials can be obtained, if desired. Thus, it is possible that such compounds contain in excess of 100 carbon atoms; indeed, 125–150 carbon atoms would be present in a number of compounds which readily suggest themselves, in view of what has been said.

It is to be noted that this second step is an esterification reaction, and the same procedure is employed as suggested above in the preparation of the intermediate product. Needless to say, any particular method may be used to produce the desired compounds of the kind indicated. In some instances it may be desirable to conduct the esterification reaction in the presence of a nonvolatile inert solvent which simply acts as a diluent or viscosity reducer.

In the preceding examples, attention has been directed primarily to the monomeric form, or, at least, to the form in which the bifunctional alcohol, i. e., a glycol, and the polyfunctional acid, usually a bifunctional compound, react to give a chain type compound, in which the adjacent acid and glycol nucleus occur as a structural unit. For instance, in the monomeric form this may be indicated in the following manner:

$$\text{acid} \ldots \text{glycol} \ldots \text{acid}$$

If, however, one prepared an intermediate product employing the ratio of three moles of maleic anhydride and two moles of nonaethylene glycol, the tendency would be to produce a product which might be indicated in the following manner:

$$\text{acid} \ldots \text{glycol} \ldots \text{acid} \ldots \text{glycol} \ldots \text{acid}$$

Similarly, three moles of the glycol and four moles of the acid might tend to give a combination which may be indicated thus:

$$\text{acid} \ldots \text{glycol} \ldots \text{acid} \ldots \text{glycol} \ldots$$
$$\text{acid} \ldots \text{glycol} \ldots \text{acid}$$

Another way of stating the matter is that the composition may be indicated in the following manner:

$$\text{TOOC.D.COO} \; [(C_2H_4O)_{m-1}C_2H_4OOC.D.COO]_x T$$

in which the characters have their previous significance and $x$ is a relatively small whole number less than 10 and probably less than 5; and in the monomeric form $x$, of course, is 1. The limitations on the size of $x$ are probably influenced, largely, by the fact that reaction leading to further growth is dependent upon random contact.

Some of the products are self-emulsifiable oils, or self-emulsifiable compounds; whereas, others give cloudy solutions or sols; and the most desirable type is characterized by giving a clear solution in water, and usually in the presence of soluble calcium or magnesium salts, and frequently, in the presence of significant amounts of either acids or alkalies.

Water solubility can be enhanced in a number of ways which have been suggested by previous manufacturing directions, for instance:

(a) By using a more highly polymerized ethylene glycol;

(b) By using a polymeric form instead of a monomeric form in regard to the unit which forms the chain between the two alcoholic nuclei;

(c) By using a polybasic carboxy acid of lower molecular weight, for instance, maleic acid instead of adipic acid; and (d) By using an alcoholic reactant of lower molecular weight, or one having more hydroxyl groups, or possibly, having one or more ether groups.

Indeed, in many instances, the hydroxylated body may show some tendency towards water solubility, or self-emulsification, prior to reaction with a glycol ester. It is to be noted in this instance that the hydroxylated materials which are employed prior to reaction with the glycol ester are largely of the water-insoluble type; but in such instances where they are self-emulsifiable, or show hydrophile properties, they are equally suitable.

Actually, a reaction involving an alcohol and an acid (esterification) may permit small amounts of either one or both of the reactants, depending upon the predetermined proportion, to remain in an unreacted state. In the actual preparation of compositions of the kind herein contemplated, any residual acidity can be removed by any suitable base, for instance, ammonia, triethanolamine, or the like, especially in dilute solution. Naturally, precaution should be taken, so that neutralization takes place without saponification or decomposition of the ester. In some cases there is no objection to the presence of acidic group. Indeed, if a tribasic acid be employed in such a manner as to leave one free carboxyl group, then it is usually desirable to neutralize such group by means of a suitable basic material.

In the hereto appended claims, reference to a neutral product refers to one in which free carboxylic radicals are absent.

Conventional demulsifying agents employed in the treatment of oil field emulsions are used as such, or after dilution with any suitable solvent, such as water; petroleum hydrocarbons, such as gasoline, kerosenne, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials herein described may be admixed with one or more of the solvents customarily used in connection with conventional demulsifying agents, provided that such compounds are compatible. They will be compatible with the hydrophile type of solvent in all instances. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials herein described, except that they are invariably water-soluble.

We desire to point out that the superiority of the reagent or demulsifying agent contemplated in our herein described process for breaking p troleum emulsions, is based upon its ability treat certain emulsions more advantageously a1 at a somewhat lower cost than is possible wi other available demulsifiers, or conventional mi tures thereof. It is believed that the particul demulsifying agent or treating agent herein d scribed will find comparatively limited applic tion, so far as the majority of oil field emulsio1 are concerned; but we have found that such demulsifying agent has commercial value, as will economically break or resolve oil field emu sions in a number of cases which cannot be trea ed as easily or at so low a cost with the demu sifying agents heretofore available.

In practising our improved process for resol ing petroleum emulsions of the water-in-oil typ a treating agent or demulsifying agent of tl kind above described is brought into contact wi or caused to act upon the emulsion to be treate in any of the various ways, or by any of tl various apparatus now generally used to resol or break petroleum emulsions with a chemic reagent, the above procedure being used eith alone, or in combination with other demulsif, ing procedure, such as the electrical dehydr tion process.

The demulsifier herein contemplated may 1 employed in connection with what is common known as down-the-hole procedure, i. e., bringir the demulsifier in contact with the fluids of tl well at the bottom of the well, or at some poi1 prior to their emergence. This particular ty1 of application is decidedly feasible when the d1 mulsifier is used in connection with acidifica tion of calcareous oil bearing strata, especial: if suspended in or dissolved in the acid employe for acidification.

It will be apparent to those skilled in the a: that residual carboxyl acidity can be eliminate by esterification with a low molal alcohol, f( instance, ethyl, methyl, or propyl alcohol, by cor ventional procedure, so as to give a substantiall neutral product. The introduction of such lo molal hydrophobe groups does not seriously a1 fect the solubility, and in some instances, give increased resistance, to soluble calcium, an magnesium salts, for such property is of pa1 ticular value. Usually, however, neutralizatio with a dilute solution of ammonia or the lik is just as practicable and less expensive.

In the hereto appended claims it is intende that the monomeric forms contemplate also th polymeric forms, insofar that the polymeri forms are nothing more or less than a repetitio of the monomeric forms several times over, wit: the loss of one or more moles of water.

Having thus described our invention, what w claim as new and desire to secure by Letter Patent is:

1. A process for breaking petroleum emulsion of the water-in-oil type, characterized by sub jecting the emulsion to the action of a demulsify ing agent comprising a water-soluble esterifica tion product, derived by reaction between on mole of a polybasic compound and two moles o a hydroxylated acylated diamide; the polybasi compound being the esterification product of (A a polyalkylene glycol having at least 7 and no more than 17 ether linkages, and the alkylen radical thereof containing at least 2 and no more than 6 carbon atoms; and (B) a polybasi carboxy acid having not more than 6 carbo1 atoms; and the ratio of the esterifying reactant being within the range of more than 1 and no over 2 moles of the polybasic acid for each mole of the glycol; said hydroxylated acylated diamide containing: (a) an acyl radical derived from a polybasic carboxy acid having not more than 6 carbon atoms, and the acyl radical thereof linked to two amino nitrogen atoms; (b) an acyl radical derived from a detergent-forming monocarboxy acid having at least 8 and not more than 32 carbon atoms; and (c) an alcoholiform hydroxyl radical.

2. A process for breaking petroleum emulsions of the water-in-oil type, characterized by subjecting the emulsion to the action of a demulsifying agent comprising a neutral, water-soluble esterification product, derived by reaction between one mole of a polybasic compound and two moles of a hydroxylated acylated diamide; the polybasic compound being the esterification product of (A) a polyalkylene glycol having at least 7 and not more than 17 ether linkages, and the alkylene radical thereof containing at least 2 and not more than 6 carbon atoms; and (B) a polybasic carboxy acid having not more than 6 carbon atoms; and the ratio of the esterifying reactants being within the range of more than 1 and not over 2 moles of the polybasic acid for each mole of the glycol; said hydroxylated acylated diamide containing: (a) an acyl radical derived from a polybasic carboxy acid having not more than 6 carbon atoms, and the acyl radical thereof linked to two amino nitrogen atoms; (b) an acyl radical derived from a detergent-forming monocarboxy acid having at least 8 and not more than 32 carbon atoms; and (c) an alcoholiform hydroxyl radical.

3. A process for breaking petroleum emulsions of the water-in-oil type, characterized by subjecting the emulsion to the action of a demulsifying agent comprising a neutral, water-soluble esterification product, derived by reaction between one mole of a dibasic compound and two moles of a hydroxylated acylated diamide; the dibasic compound being the esterification product of (A) a polyalkylene glycol having at least 7 and not more than 17 ether linkages, and the alkylene radical thereof containing at least 2 and not more than 6 carbon atoms; and (B) a dibasic carboxy acid having not more than 6 carbon atoms; and the ratio of the esterifying reactants being within the range of more than 1 and not over 2 moles of the dibasic acid for each mole of the glycol; said hydroxylated acylated diamide containing: (a) an acyl radical derived from a polybasic carboxy acid having not more than 6 carbon atoms, and the acyl radical thereof linked to two amino nitrogen atoms; (b) an acyl radical derived from a detergent-forming monocarboxy acid having at least 8 and not more than 32 carbon atoms; and (c) an alcoholiform hydroxyl radical.

4. A process for breaking petroleum emulsions of the water-in-oil type, characterized by subjecting the emulsion to the action of a demulsifying agent comprising a neutral, water-soluble esterification product, derived by reaction between one mole of a dibasic compound and two moles of a hydroxylated acylated diamide; the dibasic compound being the esterification product of (A) a polyalkylene glycol having at least 7 and not more than 17 ether linkages, and the alkylene radical thereof containing at least 2 and not more than 4 carbon atoms; and (B) a dibasic carboxy acid having not more than 6 carbon atoms; and the ratio of the esterifying reactants being within the range of more than 1 and not over 2 moles of the dibasic acid for each mole of the glycol; said hydroxylated acylated diamide containing: (a) an acyl radical derived from a polybasic carboxy acid having not more than 6 carbon atoms, and the acyl radical thereof linked to two amino nitrogen atoms; (b) an acyl radical derived from a detergent-forming monocarboxy acid having at least 8 and not more than 32 carbon atoms; and (c) an alcoholiform hydroxyl radical.

5. A process for breaking petroleum emulsions of the water-in-oil type, characterized by subjecting the emulsion to the action of a demulsifying agent comprising a neutral, water-soluble esterification product, derived by reaction between one mole of the dibasic compound and two moles of a hydroxylated acylated diamide; the dibasic compound being the esterification product of (A) a polyethylene glycol having at least 7 and not more than 17 ether linkages; and (B) a dibasic carboxy acid having not more than 6 carbon atoms; and the ratio of the esterifying reactants being within the range of more than one and not over two moles of the dibasic acid for each mole of the glycol; and said hydroxylated acylated amide containing: (a) an acyl radical derived from a polybasic carboxy acid having not more than 6 carbon atoms, and the acyl radical thereof linked to two amino nitrogen atoms; (b) an acyl radical derived from a detergent-forming monocarboxy acid having at least 8 and not more than 32 carbon atoms; and (c) an alcoholiform hydroxyl radical.

6. A process for breaking petroleum emulsions of the water-in-oil type, characterized by subjecting the emulsion to the action of a demulsifying agent comprising a neutral, water-soluble chemical compound of the following formula type:

TOOC.D.COO[(C₂H₄O)ₘC₂H₄OOC.D.COO]ₓT in which T is a radical derived by dehydroxylation of a hydroxylated acylated diamide containing: (a) an acyl radical derived from a polybasic carboxy acid having not more than 6 carbon atoms, and the acyl radical thereof linked to two amino nitrogen atoms; (b) an acyl radical derived from a detergent-forming monocarboxy acid having at least 8 and not more than 32 carbon atoms; and (c) an alcoholiform hydroxyl radical; OOC.D.COO is the acid radical derived from a dibasic acid by removal of the acidic hydrogen atoms; said acid radical having not over 6 carbon atoms; m represents a numeral varying from 7 to 12; and x is a small whole number less than 10.

7. A process for breaking petroleum emulsions of the water-in-oil type, characterized by subjecting the emulsion to the action of a demulsifying agent comprising a neutral, water-soluble chemical compound of the following formula type:

TOOC.D.COO(C₂H₄O)ₘC₂H₄OOC.D.COO.T in which T is a radical derived by dehydroxylation of a hydroxylated acylated diamide containing: (a) an acyl radical derived from a polybasic carboxy acid having not more than 6 carbon atoms, and the acyl radical thereof linked to two amino nitrogen atoms; (b) an acyl radical derived from a detergent-forming monocarboxy acid having at least 8 and not more than 32 carbon atoms; and (c) an alcoholiform hydroxyl radical; OOC.D.COO is the acid radical derived from a dibasic acid by removal of the acidic hydrogen atoms; said acid radical having not over 6 carbon atoms; and $m$ represents a numeral varying from 7 to 12.

8. A process for breaking petroleum emulsions of the water-in-oil type, characterized by subjecting the emulsion to the action of a demulsifying agent comprising a neutral, water soluble chemical compound of the following formula type:

TOOC.D.COO(C₂H₄O)ₘC₂H₄OOC.D.COO.T in which T is a radical derived by dehydroxylation of a hydroxylated acylated diamide containing: (a) an acyl radical derived from a polybasic carboxy acid having not more than 6 carbon atoms, and the acyl radical thereof linked to two amino nitrogen atoms; (b) an acyl radical derived from a detergent-forming monocarboxy acid having at least 8 and not more than 32 carbon atoms; and (c) an alcoholiform hydroxyl radical; OOC.D.COO is the acid radical derived from maleic acid by removal of the acidic hydrogen atoms; and $m$ represents a numeral varying from 7 to 12.

9. A process for breaking petroleum emulsions of the water-in-oil type, characterized by subjecting the emulsion to the action of a demulsifying agent comprising a neutral, water-soluble chemical compound of the following formula type:

TOOC.D.COO(C₂H₄O)ₘC₂H₄OOC.D.COO.T in which T is a radical derived by dehydroxylation of a hydroxylated acylated diamide containing: (a) an acyl radical derived from a polybasic carboxy acid having not more than 6 carbon atoms, and the acyl radical thereof linked to two amino nitrogen atoms; (b) an acyl radical derived from a detergent-forming monocarboxy acid having at least 8 and not more than 32 carbon atoms; and (c) an alcoholiform hydroxyl radical; OOC.D.COO is the acid radical derived from succinic acid by removal of the acidic hydrogen atoms; and $m$ represents a numeral varying from 7 to 12.

10. A process for breaking petroleum emulsions of the water-in-oil type, characterized by subjecting the emulsion to the action of a demulsifying agent comprising a neutral, water-soluble chemical compound of the following formula type:

TOOC.D.COO(C₂H₄O)ₘC₂H₄OOC.D.COO.T in which T is a radical derived by dehydroxylation of a hydroxylated acylated diamide containing: (a) an acyl radical derived from a polybasic carboxy acid having not more than 6 carbon atoms, and the acyl radical thereof linked to two amino nitrogen atoms; (b) an acyl radical derived from a detergent-forming monocarboxy acid having at least 8 and not more than 32 carbon atoms; and (c) an alcoholiform hydroxyl radical; OOC.D.COO is the acid radical derived from adipic acid by removal of the acidic hydrogen atoms; and $m$ represents a numeral varying from 7 to 12.

MELVIN DE GROOTE.
BERNHARD KEISER.